(12) United States Patent
Degawa et al.

(10) Patent No.: US 10,345,854 B2
(45) Date of Patent: Jul. 9, 2019

(54) HEAD MOUNTED DISPLAY

(71) Applicant: KYOCERA Corporation, Kyoto, Kyoto (JP)

(72) Inventors: Tomohiro Degawa, Tokyo (JP); Kouichirou Fujihara, Yokohama (JP); Keisuke Okada, Yokohama (JP); Jun Matsuzawa, Kawasaki (JP); Yoshiteru Kurosaki, Yokohama (JP); Susumu Ozawa, Ebina (JP); Shingo Ito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/468,304

(22) Filed: Mar. 24, 2017

(65) Prior Publication Data

US 2017/0277221 A1    Sep. 28, 2017

(30) Foreign Application Priority Data

Mar. 28, 2016   (JP) .................................. 2016-064380

(51) Int. Cl.
  *G06F 1/16* (2006.01)

(52) U.S. Cl.
  CPC ............ *G06F 1/1632* (2013.01); *G06F 1/163* (2013.01)

(58) Field of Classification Search
  CPC ............ C12Q 1/6886; C12Q 2600/118; C12Q 2600/156; G06F 19/10; G06F 1/163; G06F 1/1632
  See application file for complete search history.

(56) References Cited

U.S. PATENT DOCUMENTS

| | | | | |
|---|---|---|---|---|
| 5,683,297 | A * | 11/1997 | Raviv | A63F 13/20 273/DIG. 17 |
| 6,902,483 | B2 * | 6/2005 | Lin | A63F 13/04 273/148 B |
| 9,799,301 | B2 * | 10/2017 | Sahin | G06F 1/163 |
| 2002/0083318 | A1 * | 6/2002 | Larose | G06F 21/10 713/164 |
| 2004/0263494 | A1 * | 12/2004 | Poor | A63F 13/10 345/204 |
| 2006/0265378 | A1 * | 11/2006 | Koseki | G06F 17/30067 |
| 2010/0079356 | A1 * | 4/2010 | Hoellwarth | G02B 27/017 345/8 |
| 2012/0268433 | A1 | 10/2012 | Horii et al. | |
| 2015/0002373 | A1 * | 1/2015 | Kobayashi | G02B 27/017 345/8 |
| 2015/0363121 | A1 * | 12/2015 | Jung | G06F 13/4068 711/154 |
| 2016/0026814 | A1 * | 1/2016 | Jung | G06F 21/31 726/28 |
| 2016/0342202 | A1 * | 11/2016 | Kang | G06F 3/011 |
| 2017/0272604 | A1 * | 9/2017 | Nakatani | H04N 1/32448 |

FOREIGN PATENT DOCUMENTS

JP    2012-231259 A    11/2012

* cited by examiner

*Primary Examiner* — Kenneth Bukowski
(74) *Attorney, Agent, or Firm* — Hauptman Ham, LLP (57) ABSTRACT

There is provided a head mounted display comprising: an interface unit to which a cartridge can be connected; and at least one controller configured to activate a predetermined operation mode according to information acquired from the cartridge when the cartridge is connected to the interface unit.

6 Claims, 10 Drawing Sheets

| FUNCTION OF HEAD MOUNTED DISPLAY | FUNCTION SETTING FOR ATTRACTION A | FUNCTION SETTING FOR ATTRACTION B | FUNCTION SETTING FOR ATTRACTION C |
|---|---|---|---|
| CALL | OFF | ON | OFF |
| EMAIL | OFF | OFF | OFF |
| IMAGING | OFF | OFF | ON |
| SHORT RANGE WIRELESS COMMUNICATION | ON | OFF | ON |
| SOUND INPUT/OUTPUT | ON | ON | ON |
| DISPLAY | ON | ON | ON |
| NOTIFICATION | OFF | OFF | OFF |
| TOUCH OPERATION | ON | ON | OFF |
| POSITION DETECTION | OFF | OFF | OFF |
| VIBRATION | OFF | OFF | ON |
| ACCELERATION DETECTION | OFF | OFF | ON |
| ANOTHER APPLICATION | OFF | OFF | OFF |
| SCREEN ADJUSTMENT | ON (BRIGHTNESS 80%) | ON (BRIGHTNESS 50%) | ON (BRIGHTNESS 30%) |

FIG.9

| FUNCTION OF HEAD MOUNTED DISPLAY | FUNCTION SETTING BEFORE CARTRIDGE IS CONNECTED | FUNCTION SETTING AFTER CARTRIDGE IS CONNECTED |
|---|---|---|
| CALL | ON | ON |
| EMAIL | ON | OFF |
| IMAGING | ON | OFF |
| SHORT RANGE WIRELESS COMMUNICATION | ON | OFF |
| SOUND INPUT/OUTPUT | ON | ON |
| DISPLAY | ON | ON |
| NOTIFICATION | ON | OFF |
| TOUCH OPERATION | ON | ON |
| POSITION DETECTION | ON | OFF |
| VIBRATION | ON | OFF |
| ACCELERATION DETECTION | ON | OFF |
| ANOTHER APPLICATION | ON | OFF |
| SCREEN ADJUSTMENT | ON (BRIGHTNESS 80%) | ON (BRIGHTNESS 50%) |

HEAD MOUNTED DISPLAY

CROSS-REFERENCE TO RELATED APPLICATION

The present application claims priority to and incorporates by reference the entire contents of Japanese Patent Application No. 2016-064380 filed in Japan on Mar. 28, 2016.

FIELD

The present application relates to a head mounted display.

BACKGROUND

As a display device, there is provided a display device which is to be mounted on a head of a user.

A display device to be mounted on a head of a user having enhanced usability is desired.

SUMMARY

A head mounted display is disclosed.

According to one aspect, there is provided a head mounted display comprising: an interface unit to which a cartridge can be connected; and at least one controller configured to activate a predetermined operation mode according to information acquired from the cartridge when the cartridge is connected to the interface unit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Embodiments of a head mounted display according to the present application will be described in detail with reference to the drawings. A user of the head mounted display according to the present application may receive various services through the head mounted display by connecting an externally connectable cartridge to the head mounted display and loading specific contents into the head mounted display from the cartridge. A cartridge that can be externally connected to the head mounted display may be provided by various indoor/outdoor facilities and the like capable of providing services through the head mounted display, including a business park, a shopping center, a fashion mall, a park, an amusement park, a high-technology park, a home and the like.

Figure 1:
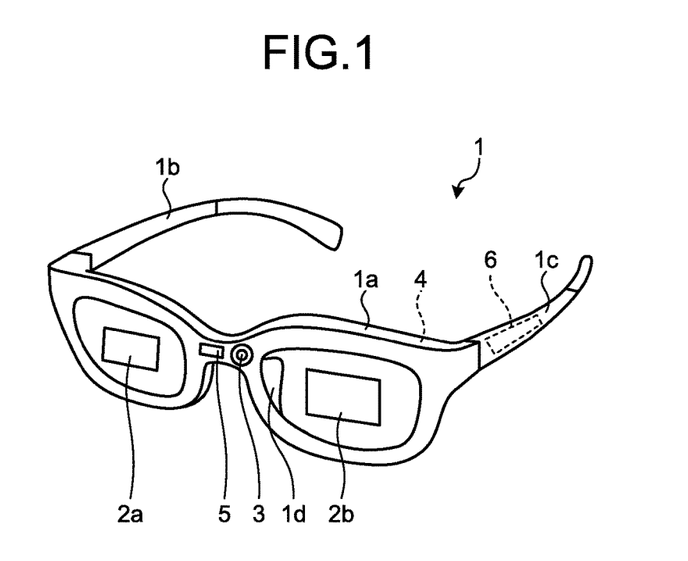
FIG. 1 is a diagram illustrating a schematic external configuration of a head mounted display according to embodiments.

FIG. 1 is a diagram illustrating a schematic external configuration of the head mounted display according to embodiments. As illustrated in FIG. 1, a head mounted display 1 is shaped as eyeglasses, and includes a front 1a, a temple 1b, a temple 1c, and a nose pad 1d. The shape of the head mounted display 1 illustrated in FIG. 1 is merely an example, and the head mounted display 1 is not limited to the shape illustrated in FIG. 1 as long as functions of a wearable terminal to be mounted on a head can be realized.

The front 1a is formed to at least partially surround outer circumferential portions of a display 2a and a display 2b. The front 1a is a part that comes in front of eyes of a user of the head mounted display 1 when the head mounted display 1 is worn by the user. The nose pad 1d includes a pair of pads (not illustrated), and contacts a nose of the user of the head mounted display 1 by pinching the nose when the head mounted display 1 is worn by the user. The nose pad 1d contributes to support the head mounted display 1 worn by the user in such a manner that the head mounted display 1 does not slip off a face of the user in the gravitational direction and its mounted attitude is maintained as much as possible.

An imager 3, an imager 4, a detector 5, an operation part 6 and the like are also installed at the front 1a.

The temple 1b and the temple 1c are formed to have the same bar shape. The temple 1b and the temple 1c are parts which are arranged along sides of the head of the user of the head mounted display 1 when the head mounted display 1 is worn by the user. One end portion of the temple 1b and one end portion of the temple 1c are parts which are connected to the front 1a via hinges (not illustrated) in a manner capable of being folded. The other end portion of the temple 1b and the other end portion of the temple 1c are parts which are fitted to the ears of the user of the head mounted display 1 when the head mounted display 1 is worn by the user. Like the nose pad 1d, the temple 1b and the temple 1c also contribute to support the head mounted display 1 worn by the user in such a manner that the head mounted display 1 does not slip off the face of the user in the gravitational direction and its mounted attitude is maintained as much as possible.

Figure 2:
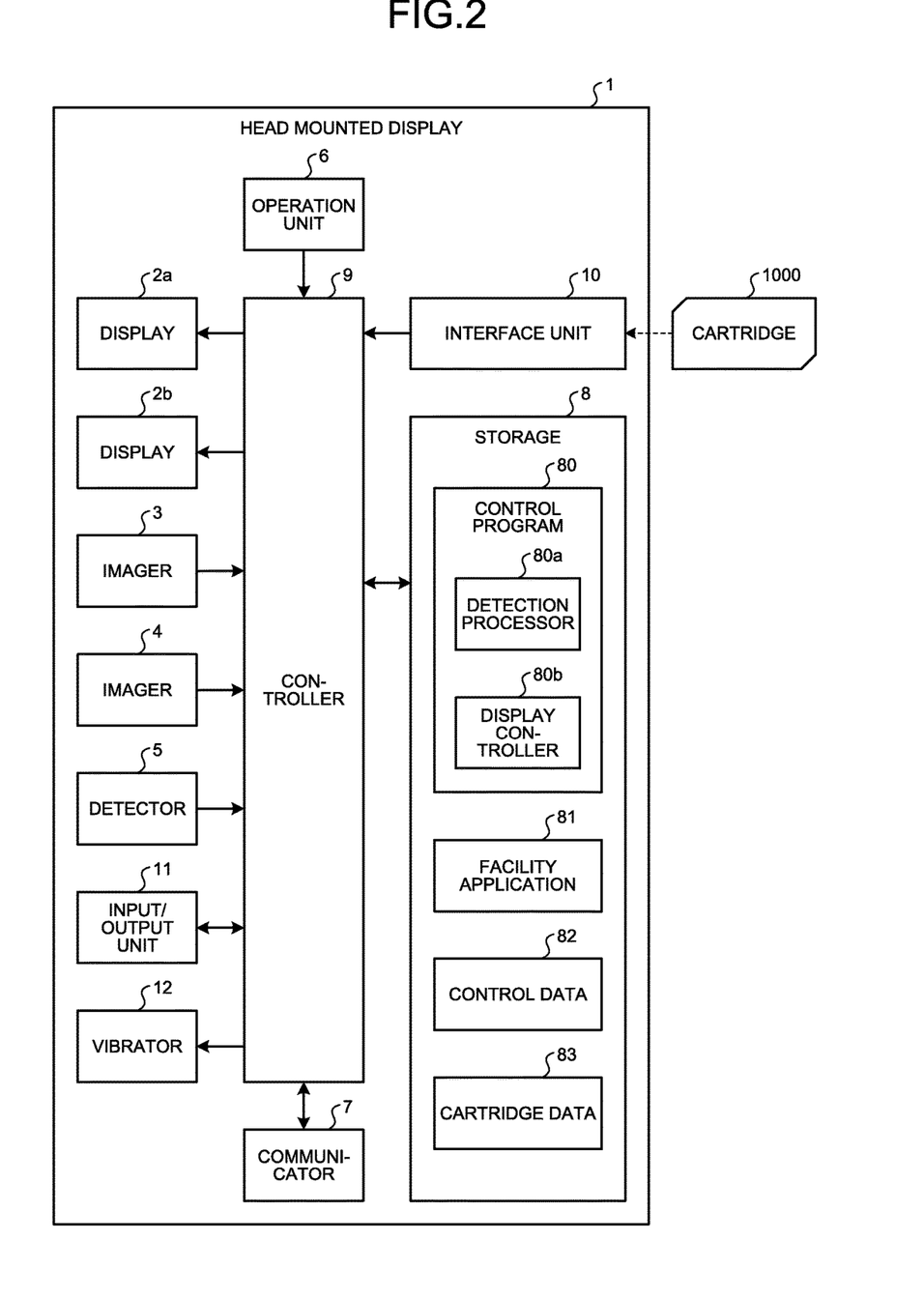
FIG. 2 is a block diagram illustrating an example of a functional configuration of the head mounted display according to embodiments.

FIG. 2 is a block diagram illustrating an example of a functional configuration of the head mounted display according to embodiments.

As illustrated in FIG. 2, the head mounted display 1 is configured to include a display 2a, a display 2b, an imager 3, an imager 4, a detector 5, an operation part 6, a communicator 7, a storage 8, a controller 9, an interface unit 10, an input/output unit 11, and a vibrator 12.

Each of the display 2a and the display 2b may include a transflective or transmissive display device, such as a liquid crystal display or an organic electro-luminescence (EL) panel. The display 2a and display 2b display various pieces of information according to control signals from the controller 9. Each of the display 2a and the display 2b may be a projection device which projects images on the retinae of the user by using a light source.

Each of the imager 3 and the imager 4 electronically captures an image by an image sensor such as a charge coupled device (CCD) or a complementary metal oxide semiconductor (CMOS). Each of the imager 3 and the imager 4 converts the captured image into a signal, and outputs the signal to the controller 9. For example, the imager 3 is a front camera for capturing the view in front of the user wearing the head mounted display 1. For example, the imager 4 is a rear camera for capturing the user wearing the head mounted display 1.

The detector 5 performs various types of detection. The detector 5 is capable of detecting a detection target, a change in state of the detection target, and the like by using at least one of visible light, infrared light, ultraviolet light, radio waves, acoustic waves, magnetism, and capacitance. A detection target may be a still object, a moving object, a living object, or a non-living object. The detector 5 outputs a detection result to the controller 9. The detector 5 may include an accelerometer. The accelerometer is capable of detecting acceleration acting on the head mounted display 1. The detection result of the accelerometer may be used to detect moving and stopping of the user carrying the head mounted display 1. The detector 5 is capable of detecting a current position of the head mounted display 1. The detector 5 may detect the current position by a global positioning system (GPS) receiver. The detector 5 may alternatively detect the current position based on a base station communicated by the communicator 7 for wireless communication. The detector 5 may alternatively detect the current position by a plurality of methods in combination.

The operation part 6 receives, from the user, operation input for activation or deactivation of the head mounted display 1, changes in various settings including operation settings, and the like. The operation part 6 converts the operation input from the user into a signal, and outputs the signal to the controller 9. The operation part 6 may use an input device such as buttons, keys, a touch screen and the like to receive the operation input. For example, the operation part 6 includes a touch sensor that detects contact by the user.

The communicator 7 is capable of communicating with other devices. For example, the communicator 7 is capable of transmitting/receiving, by a predetermined communication protocol, various pieces of information which are to be exchanged with another head mounted display or a facility server installed in a facility. The communicator 7 is capable of establishing a communication connection to another head mounted display. One or a plurality of communication standards for short range wireless communication may be supported by the communicator 7. The communication standards for short range wireless communication include IEEE 802.11, Bluetooth (registered trademark), Infrared Data Association (IrDA), Short range Communication (NFC), and Wireless Personal Area Network (WPAN), for example.

The storage 8 stores programs, data and the like. Programs stored in the storage 8 include a control program 80. Applications stored in the storage 8 include a facility application 81. Data stored in the storage 8 include control data 82, and cartridge data 83.

The storage 8 may be used as a work area for temporarily storing a processing result of the controller 9. The storage 8 may be configured by any non-transitory storage medium such as a semiconductor storage medium or a magnetic storage medium. The storage 8 may include a plurality of types of storage media. The storage 8 may include a combination of a storage medium, such as a memory card, an optical disk or a magneto-optical disk, and a reader/writer device for the storage medium. The storage 8 may include a storage device to be used as a temporary storage area for a random access memory (RAM) or the like. Programs stored in the storage 8 may include a program (not illustrated) for supporting operation of an application. Programs stored in the storage 8 may be acquired from other devices, such as servers, by wireless or wired communication.

The control program 80 provides functions for various control by the head mounted display 1. Functions to be provided by the control program 80 include functions of a detection processor 80a, and a display controller 80b.

The detection processor 80a provides functions for performing various types of control of the head mounted display 1 based on detection results of the detector 5. The display controller 80b provides functions for performing display control for the display 2a and the display 2b.

The facility application 81 is an application for providing functions for a user of the head mounted display 1 to use equipment or the like installed inside a facility through the head mounted display 1, for example. For example, in the case of an amusement park, the facility application 81 corresponds to an application for displaying various pieces of information regarding the amusement park, such as a map of the amusement park, or an application for outputting moving images, sound and the like at the time of the user enjoying various attractions in the amusement park. When multiple pieces of equipment are installed in a facility, the facility application 81 may be configured as an application set including applications for respective pieces of equipment. The facility application 81 may be acquired from a cartridge 1000 which is externally connected to the interface unit 10.

The control data 82 is data used for various types of control of the head mounted display 1 performed by the functions provided by the control program 80. The control data 82 includes information for the functions of the head mounted display 1. Information for the functions includes information indicating state of setting of the functions of the head mounted display 1. The state of setting of the functions may be on-state which indicates that the function is valid, or off-state which indicates that the function is invalid, for example. The functions of the head mounted display 1 include a function provided by the control program 80, and a function provided by hardware. The control data 82 may be acquired from the cartridge 1000 which is externally connected to the interface unit 10.

The cartridge data 83 is data which is acquired from the cartridge 1000 externally connected to the interface unit 10. For example, in the case of an amusement park, the cartridge data 83 is used by the facility application 81 to output moving images, sound and the like to the head mounted display 1 according to a game story. The cartridge data 83 includes data for specifying on/off of a function of the head mounted display 1. The cartridge data 83 includes data for activating a function of the head mounted display 1 while executing the facility application 81. An example of the cartridge data 83 will be described later.

The controller 9 includes an arithmetic processing device. The arithmetic processing device may, but not limited to, include a central processing unit (CPU), a system-on-a-chip (SoC), a micro control unit (MCU), a field-programmable gate array (FPGA), and a co-processor. The controller 9 realizes various functions by integrally controlling the operation of the head mounted display 1. Specifically, the controller 9 realizes various types of control of the head mounted display 1 by referring to the control data 82 stored in the storage 8 as necessary and executing commands included in the control program 80 stored in the storage 8.

The interface unit 10 is open to allow insertion and connection of the cartridge 1000. When the cartridge 1000 is connected, the interface unit 10 acquires data stored in the cartridge 1000 and outputs the acquired data to the controller 9.

The input/output unit 11 may include a microphone and/or a speaker. The microphone may convert an input sound to an electrical signal, and output the signal to the controller 9. The speaker may output a sound signal from the controller 9 as a sound, for example. The vibrator 12 causes a part or a whole of the head mounted display 1 to vibrate. The vibrator 12 includes a piezoelectric element or an eccentric motor in order to generate vibration.

Figure 3:
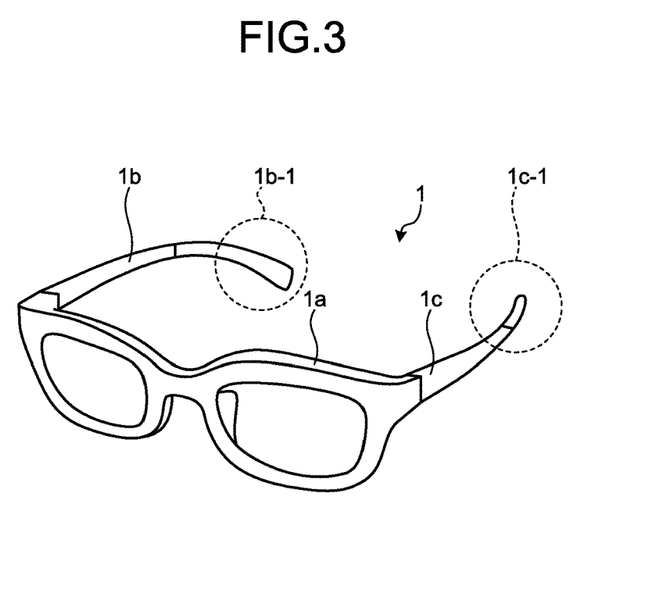
FIG. 3 is a diagram illustrating an example of an installation position of an interface unit according to embodiments.
Figure 4:
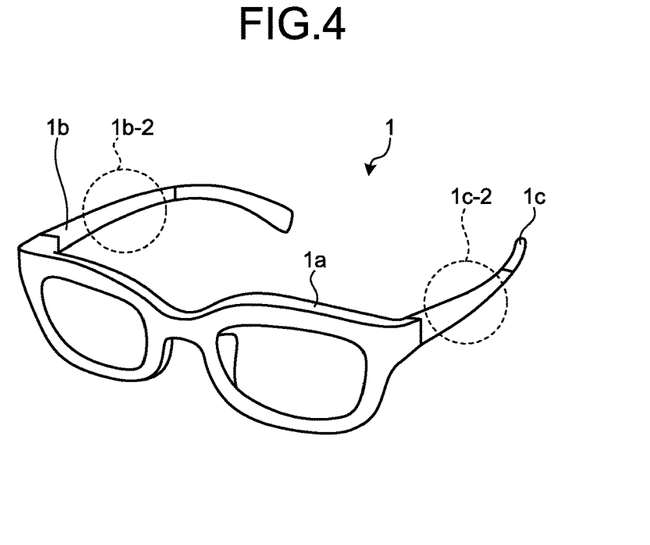
FIG. 4 is a diagram illustrating another example of the installation position of the interface unit according to embodiments.
Figure 5:
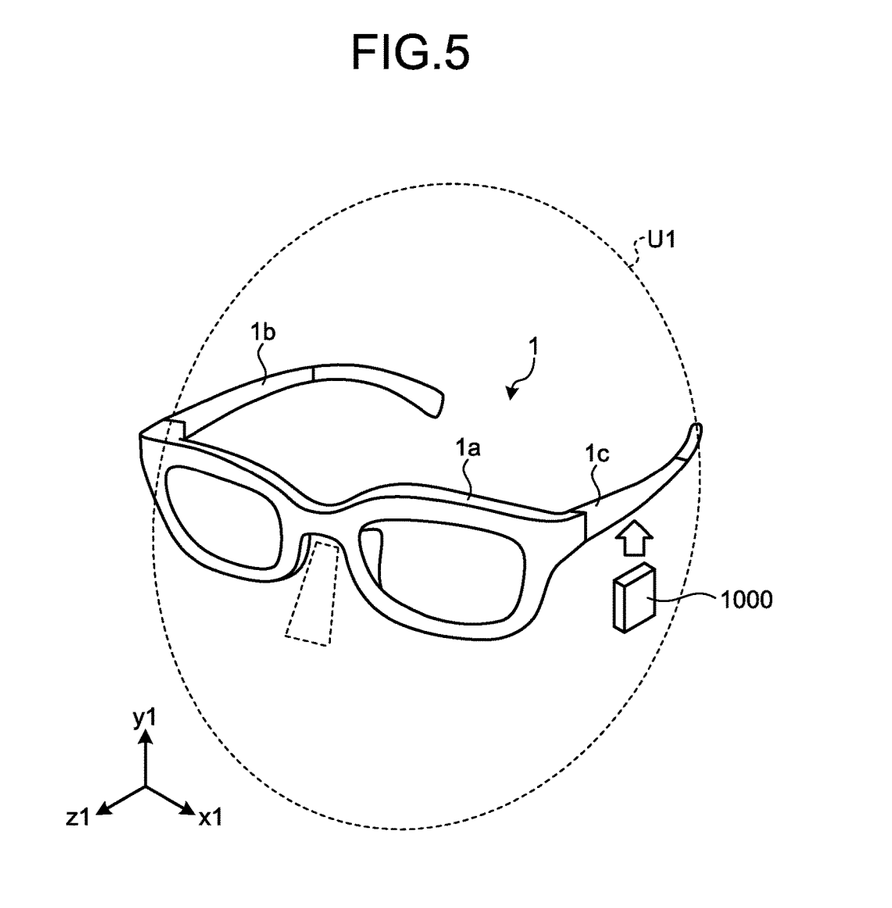
FIG. 5 is a diagram illustrating an example of a direction of an opening of the interface unit according to embodiments.
Figure 6:
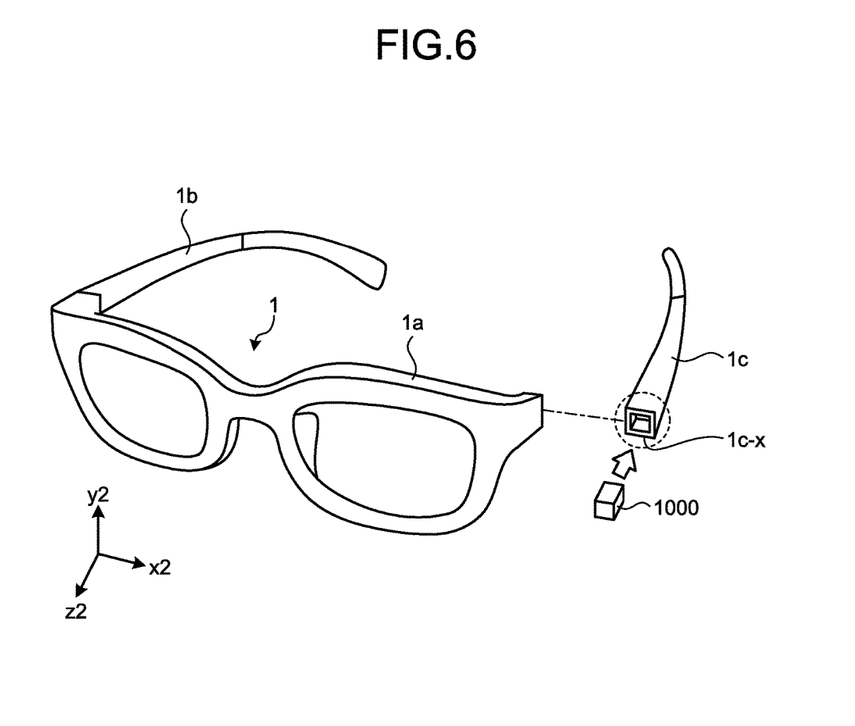
FIG. 6 is a diagram illustrating another example of the installation position and the direction of the opening of the interface unit according to embodiments.
Figure 7:
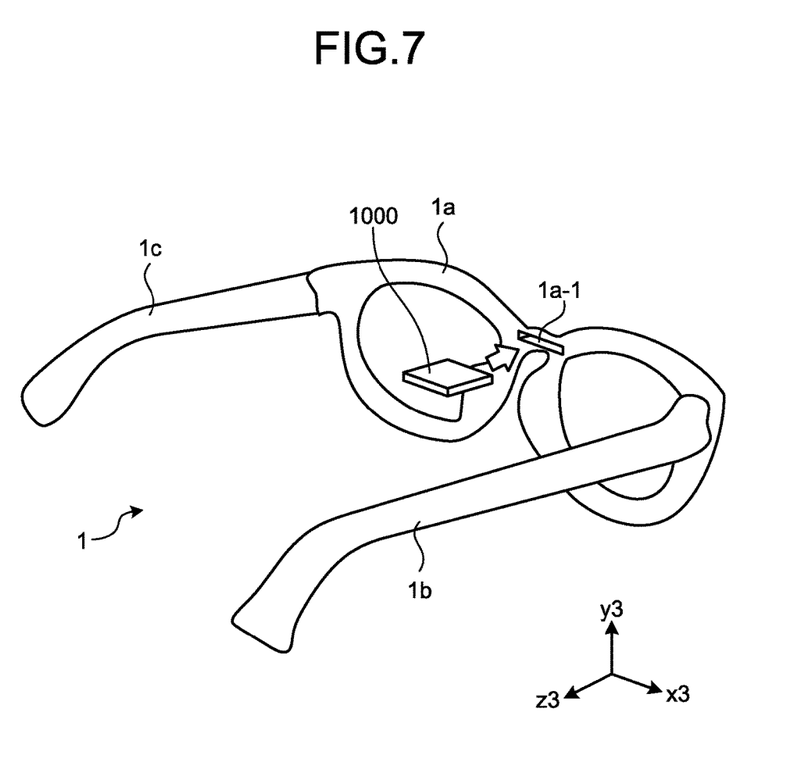
FIG. 7 is a diagram illustrating other example of the installation position and the direction of the opening of the interface unit according to embodiments.

In the following, examples of an installation position and a direction of an opening of the interface unit 10 provided to the head mounted display 1 will be described with reference to FIGS. 3 to 7. FIGS. 3 and 4 are diagrams illustrating examples of the installation position of the interface unit according to embodiments. FIG. 5 is a diagram illustrating an example of the direction of the opening of the interface unit according to embodiments. FIGS. 6 and 7 are diagrams illustrating other examples of the installation position and the direction of the opening of the interface unit according to embodiments.

As illustrated in FIG. 3, the interface unit 10 may be installed to the head mounted display 1 near an end portion 1*b*-1 of the temple 1*b* which is not connected to the front 1*a*, and near an end portion 1*c*-1 of the temple 1*c* which is not connected to the front 1*a*. Alternatively, as illustrated in FIG. 4, the interface unit 10 may be installed to the head mounted display 1 near a center 1*b*-2 of the temple 1*b*, and near a center 1*c*-2 of the temple 1*c*. For example, when the front 1*a* is heavier than the temples 1*b*, 1*c* due to including the imager 3, the imager 4, the detector 5, the operation part 6 and the like, a wearing feeling of the head mounted display 1 may be improved by connecting the cartridge 1000 to the temple 1*b* (or the temple 1*c*) due to making the weight of the temple 1*b* (or 1*c*) closer to the weight of the front 1*a*.

When the interface units 10 are installed to the temple 1*b* and the temple 1*c* the interface units 10 are open downward in the vertical direction when the head mounted display 1 is worn by the user of the head mounted display 1. According to such a configuration, dust and the like may be prevented from entering an opening (a part which are open to the outside) of the interface unit 10 of the head mounted display 1.

The direction of the opening of the interface unit 10 will be described with reference to FIG. 5. Coordinate axes, an x1-axis, a y1-axis, and a z1-axis, illustrated in FIG. 5 are orthogonal to one another. In the example illustrated in FIG. 5, the longitudinal direction of the front 1*a* of the head mounted display 1 coincides with a direction that is parallel to the x1-axis among the coordinate axes illustrated in FIG. 5. The interface unit 10 is open in an orientation which allows the cartridge 1000 to be inserted and connected to the head mounted display 1. Although not clearly illustrated, in the example illustrated in FIG. 5, when the head mounted display 1 is worn by a user U1, the interface unit 10 is open downward in the vertical direction, that is, in a direction parallel to a negative direction of the y1 axis.

The head mounted display 1 may have the interface unit 10 installed to each of the temple 1*b* and the temple 1*c* as illustrated in FIGS. 3 and 4, or may have the interface unit 10 installed to one of the temple 1*b* and the temple 1*c*.

Other example of the installation position and the direction of the opening of the interface unit 10 will be described with reference to FIG. 6. Coordinate axes, an x2-axis, a y2-axis, and a z2-axis, illustrated in FIG. 6 are orthogonal to one another. In the example illustrated in FIG. 6, the longitudinal direction of the front 1*a* of the head mounted display 1 coincides with a direction that is parallel to the x2-axis among the coordinate axes illustrated in FIG. 6. As illustrated in FIG. 6, the head mounted display 1 may have the interface unit 10 installed at a joint portion 1*c*-*x* of the temple 1*c* that contacts the front 1*a* when the temple 1*c* is completely opened. The interface unit 10 is open to allow insertion and connection of the cartridge 1000. In the example illustrated in FIG. 6, the interface unit 10 is illustrated in a state where it is open toward a positive direction of the z2-axis among the coordinate axes illustrated in FIG. 6. According to the head mounted display 1 of such a configuration, when the temple 1*c* is completely opened, the opening of the interface unit 10 is blocked by the front 1*a*, and the cartridge 1000 may be protected from an external impact and the like.

In the example illustrated in FIG. 6, the head mounted display 1 may be specified to include an opening which is open in the longitudinal direction of the temple 1*b* (or the temple 1*c*) at the temple 1*b* (or the temple 1*c*).

Other examples of the installation position and the direction of the opening of the interface unit 10 will be described with reference to FIG. 7. Coordinate axes, an x3-axis, a y3-axis, and a z3-axis, illustrated in FIG. 7 are orthogonal to one another. In the example illustrated in FIG. 7, the longitudinal direction of the front 1*a* of the head mounted display 1 coincides with a direction that is parallel to the x3-axis among the coordinate axes illustrated in FIG. 7. As illustrated in FIG. 7, the head mounted display 1 may have the interface unit 10 installed at a region 1*a*-1 of the front 1*a* which faces a face of the user. The interface unit 10 is open to allow insertion and connection of the cartridge 1000. In the example illustrated in FIG. 7, the interface unit 10 is illustrated in a state where it is open toward a positive direction of the z3-axis among the coordinate axes illustrated in FIG. 7. According to the head mounted display 1 of such a configuration, the cartridge 1000 connected to the interface unit 10 may be protected from an external impact and the like.

Figure 8:
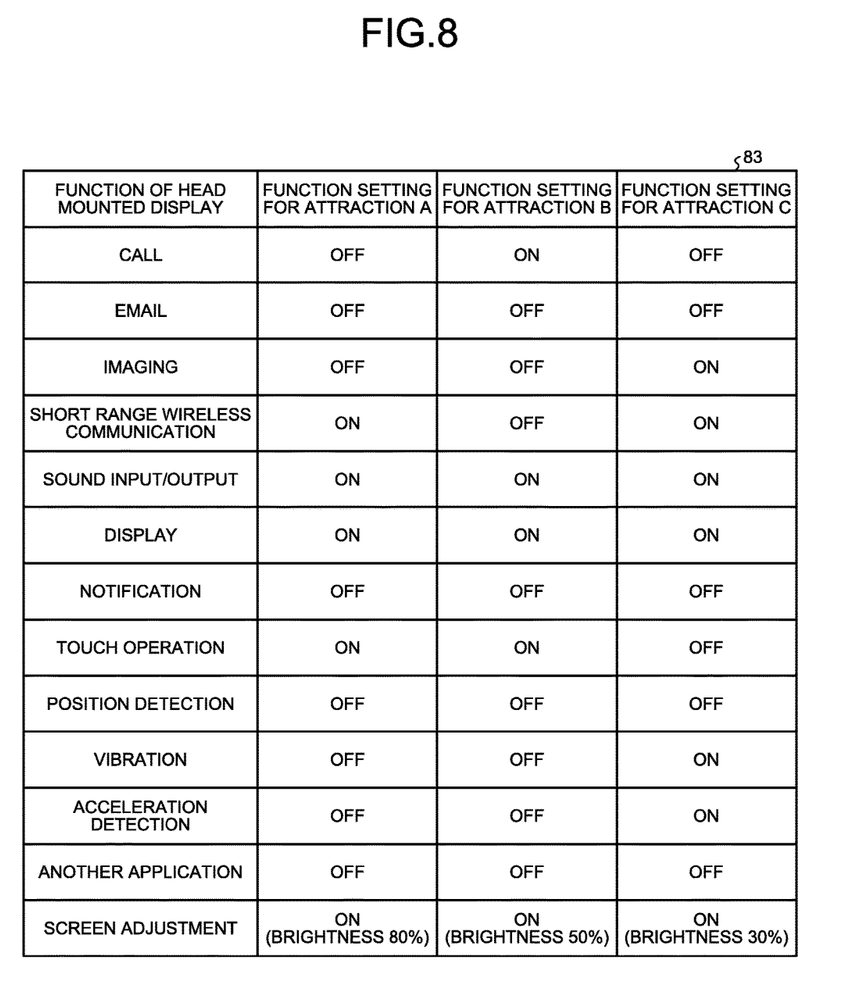
FIG. 8 is a diagram illustrating an example of cartridge data according to embodiments.

FIG. 8 is a diagram illustrating an example of the cartridge data 83 according to embodiments. As illustrated in FIG. 8, the cartridge data 83 indicates functions of the head mounted display 1 which are used in attractions among a plurality of functions of the head mounted display 1. The cartridge data 83 includes items of function of the head mounted display 1 and function setting. Information indicating a function of the head mounted display 1 may be set as the item of the function of the head mounted display 1. Information indicating whether a function of the head mounted display 1 is switched on or off when using the head mounted display 1 in an attraction may be set as the item of the function setting.

For example, when a dedicated head-up display prepared by a target attraction is used, the dedicated head-up display may be set to a mode dedicated to the attraction. However, when the head mounted display 1 of a user or a general-purpose head mounted display 1 is used in an attraction, the function of the head mounted display 1 for the attraction is possibly switched off. When a function of the head mounted display 1 which is not necessary in the attraction is switched on, the function may prevent the user from concentrating on the attraction due to activation thereof during the attraction. Accordingly, the head mounted display 1 uses the cartridge data 83 in order to automatically set the function of the head mounted display 1 used in the target attraction.

For example, when wireless communication with the attraction facility or another head mounted display is necessary, a function that is necessary in an attraction includes the function of short range wireless communication of the head mounted display 1. For example, in the case of an attraction prohibiting image capturing, a function that is unnecessary in the attraction includes the function of imaging of the head mounted display 1.

In the example illustrated in FIG. 8, the head mounted display 1 includes functions for a call, an email, imaging, short range wireless communication, sound input/output, display, notification, touch operation, position detection, vibration, acceleration detection, simultaneous execution of another application, and screen adjustment.

For example, attraction A is an interactive puzzle-solving game. The attraction A is an attraction that uses functions regarding the short range wireless communication, the sound input/output, the display, the touch operation, and the screen adjustment of the head mounted display 1. When the head mounted display 1 performs communication with a server of the facility by short range wireless communication, the function of the head mounted display 1 for short range wireless communication is required by the attraction A. Accordingly, the cartridge data 83 specifies that the functions for the short range wireless communication, the sound input/output, the display, the touch operation, and the screen adjustment of the head mounted display 1 are switched on, and that other functions are switched off. In the case of the attraction A, the cartridge data 83 specifies that the function for the screen adjustment is switched on, and that the brightness of the screen is set to 80%. As a reference, brightness of the screen at 100% is assumed to be the brightness of the screen before detection of connection of the cartridge 1000 or before execution of the facility application 81 acquired from the cartridge 1000 after connection of the cartridge 1000. Alternatively, the brightness of the screen at 100% may be assumed to be the maximum value of the brightness of the screen that can be set by the user.

For example, attraction B is a haunted house. The attraction B is an attraction that uses the functions for the call, the sound input/output, the display, the touch operation, and the screen adjustment of the head mounted display 1. Accordingly, the cartridge data 83 specifies that the functions for the call, the sound input/output, the display, the touch operation, and the screen adjustment of the head mounted display 1 are switched on, and that other functions are switched off. In the case of the attraction B, the cartridge data 83 specifies that the function for the screen adjustment is switched on, and that the brightness of the screen is set to 50%.

For example, attraction C is a roller coaster. The attraction C is an attraction that uses the functions for the imaging, the short range wireless communication, the sound input/output, the display, the vibration, the acceleration detection, and the screen adjustment of the head mounted display 1. Accordingly, the cartridge data 83 specifies that the functions for the imaging, the short range wireless communication, the sound input/output, the display, vibration, the acceleration detection, and the screen adjustment of the head mounted display 1 are switched on, and that other functions are switched off. In the case of the attraction C, the cartridge data 83 specifies that the function for the screen adjustment is switched on, and that the brightness of the screen is set to 30%.

Figure 9:
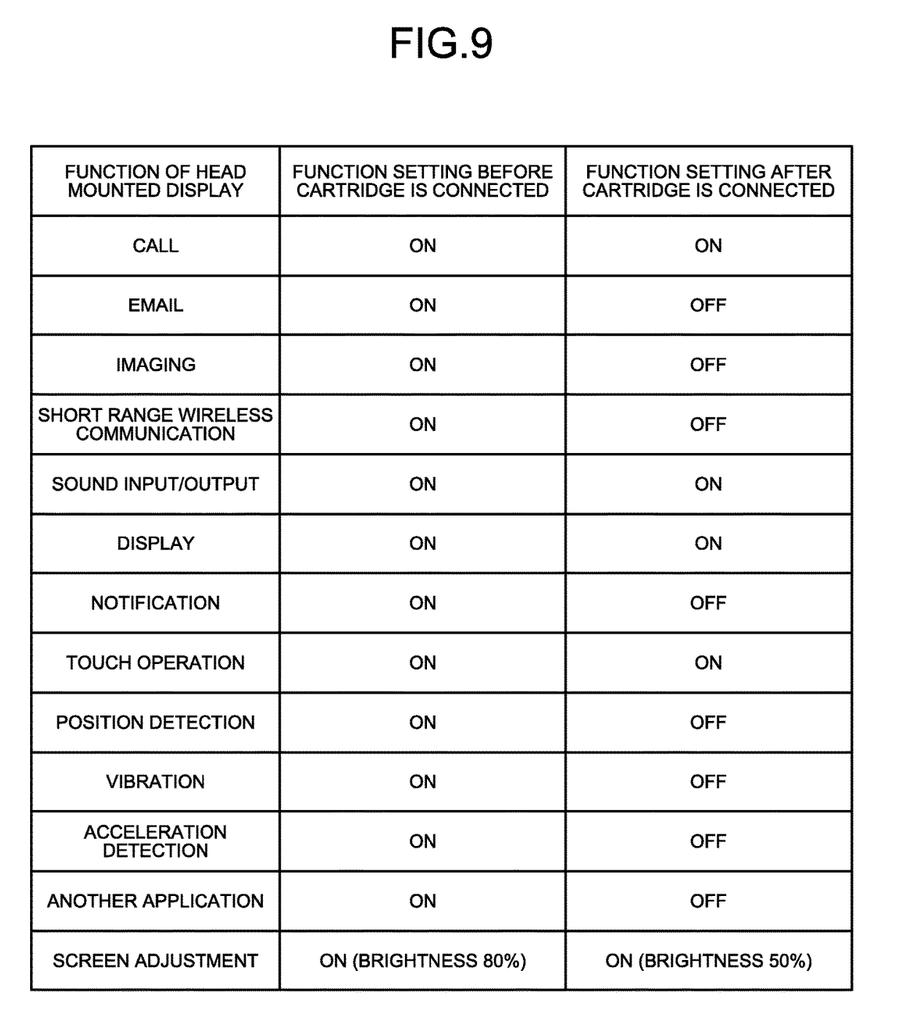
FIG. 9 is a diagram illustrating an example of an operation mode in a case of using the head mounted display in an attraction.

FIG. 9 is a diagram illustrating an example of an operation mode in a case of using the head mounted display 1 for the attraction B. As illustrated in FIG. 9, the head mounted display 1 includes functions for the call, the email, the imaging, the short range wireless communication, the sound input/output, the display, the notification, the touch operation, the position detection, the vibration, the acceleration detection, the simultaneous execution of another application, and the screen adjustment.

In the example illustrated in FIG. 9, all the functions of the head mounted display 1 are switched on before the cartridge 1000 is connected. The brightness of the screens of the display 2a and the display 2b of the head mounted display 1 is set to 80%.

When the user receives a cartridge 1000 at attraction equipment, the user connects the cartridge 1000 to the interface unit 10 and activates the head mounted display 1. The head mounted display 1 detects connection of the cartridge 1000 to the interface unit 10. When the cartridge 1000 is connected to the interface unit 10, the head mounted display 1 activates a predetermined operation mode according to the cartridge data 83 acquired from the cartridge 1000.

After activating the operation mode, the head mounted display 1 stores on/off states of the functions of the head mounted display 1. The head mounted display 1 determines the on/off state of the functions of the head mounted display 1 based on the cartridge data 83 for the attraction B. For example, when the cartridge data 83 for the attraction B includes the settings illustrated in FIG. 8, the head mounted display 1 determines to switch on the functions for the call, the sound input/output, the display, the touch operation, and the screen adjustment of the head mounted display 1, and to switch off other functions. The head mounted display 1 changes the control data 82 based on the determination result, and controls the on/off state of a plurality of functions. As a result, the functions for the call, the sound input/output, the display, the touch operation, and the screen adjustment of the head mounted display 1 used on execution of the facility application 81 are validated. The functions for the email, the imaging, the short range wireless communication, the notification, the position detection, the vibration, the acceleration detection, and the simultaneous execution of another application not used on the execution of the facility application 81 are invalidated. The head mounted display 1 changes the brightness of the screens of the display 2a and the display 2b from 80% to 50%.

As described above, when a cartridge 1000 is connected to the interface unit 10, the head mounted display 1 can put only the functions used on the execution of the facility application 81 to be executed into on state, and can put other functions into off state. Accordingly, the user does not have to change the function settings of the head mounted display 1 to use the attraction facility. Even if a function used on the execution of the facility application 81 is off, the head mounted display 1 can automatically put the function into on state before the execution of the facility application 81. As a result, because the head mounted display 1 can automatically set functions of the head mounted display 1 suitable for the facility application 81 acquired from the cartridge 1000, convenience of the head mounted display 1 is improved. By putting functions which are not used in the attraction facility into off state, power consumption of the head mounted display 1 can be reduced. For example, functions which consume a great amount of power include functions for position detection and vibration. For example, in an attraction facility prohibiting image capturing, when the function for imaging is specified to be in off state in the cartridge data 83, the head mounted display 1 may automatically put the function for imaging into off state.

By switching on the functions for the sound input/output and the display based on the cartridge data 83, the head mounted display 1 may maintain image/sound reproduction functions in the attraction facility. The user is thereby enabled to enjoy reproduced images and sounds at the attraction facility.

Figure 10:
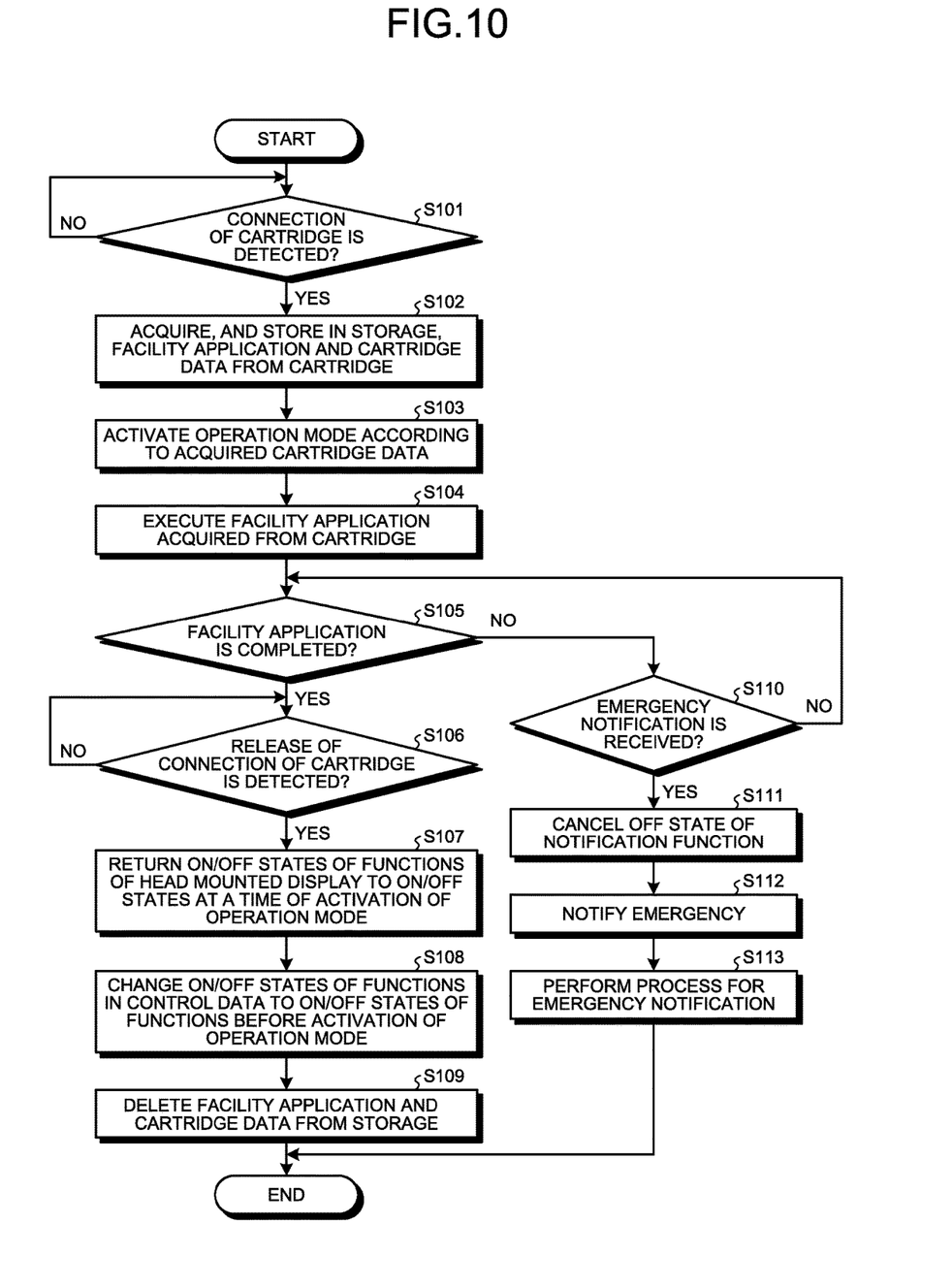
FIG. 10 is a flowchart illustrating an example of a processing procedure of control by the head mounted display according to embodiments.
Figure 11:
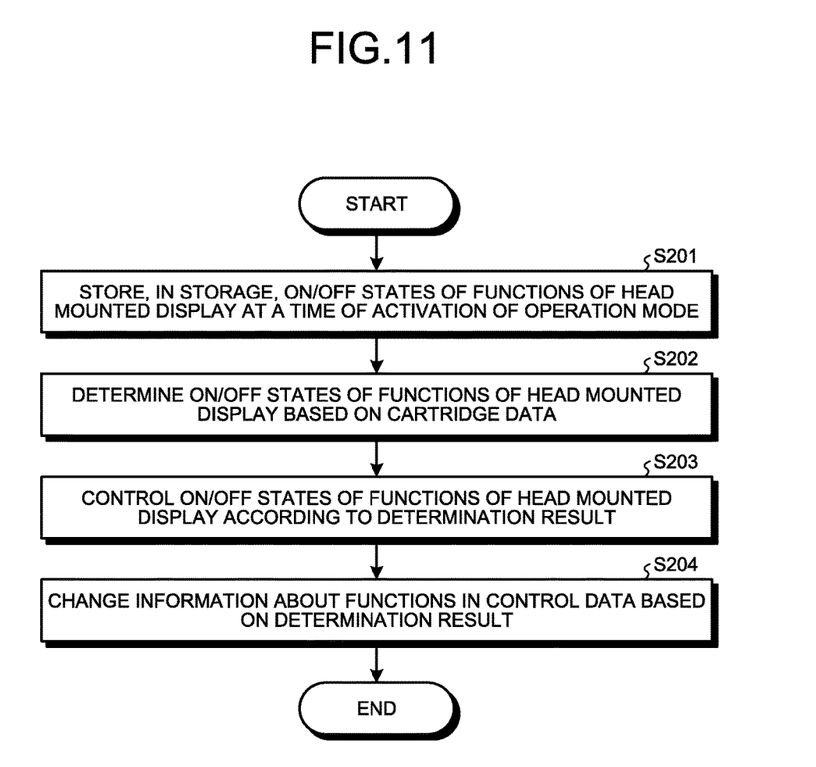
FIG. 11 is a flowchart illustrating an example of a processing procedure for an operation mode of the head mounted display according to embodiments.

FIG. 10 is a flowchart illustrating an example of a processing procedure of control by the head mounted display according to embodiments. FIG. 11 is a flowchart illustrating an example of a processing procedure for an operation mode of the head mounted display according to embodiments. The processing procedures illustrated in FIGS. 10 and 11 are realized by the controller 9 executing the control program 80.

As illustrated in FIG. 10, at Step S101, the controller 9 of the head mounted display 1 determines, using the interface unit 10, whether connection of the cartridge 1000 is detected or not. For example, the controller 9 determines that the connection of the cartridge 1000 is detected when reading/writing of data with respect to the cartridge 1000 is enabled. When it is determined that the connection of the cartridge 1000 is not detected (No at Step S101), the controller 9 repeats the process of Step S101. When it is determined that connection of the cartridge 1000 is detected (Yes at Step S101), the controller 9 proceeds to Step S102.

At Step S102, the controller 9 acquires the facility application 81 and the cartridge data 83 from the cartridge 1000 and stores them in the storage 8. At Step S103, the controller 9 activates an operation mode according to the acquired cartridge data 83. For example, the controller 9 activates an operation mode by performing processing of the operation mode illustrated in FIG. 11.

Processing by the controller 9 in an operation mode will be described with reference to FIG. 11. As illustrated in FIG. 11, at Step S201, the controller 9 stores, in the storage 8, on/off states of the functions of the head mounted display 1 at a time of activation of the operation mode. At Step S202, the controller 9 determines the on/off states of the functions of the head mounted display 1 based on the cartridge data 83. At Step S203, the controller 9 controls the on/off states of the functions of the head mounted display 1 according to the determination result at Step S202. For example, the controller 9 performs control of enabling execution of an application for a function which is to be switched on, or of executing the application. For example, the controller 9 performs control of activating hardware to be used by the function which is to be switched on. For example, the controller 9 performs control of disabling execution of an application for a function which is to be switched off. For example, the controller 9 performs control of deactivating hardware to be used by the function which is to be switched off. At Step S204, the controller 9 changes information about the functions in the control data 82 based on the determination result at Step S202, and ends the processing procedure illustrated in FIG. 11. When the processing procedure illustrated in FIG. 11 is ended, the controller 9 performs Step S104 illustrated in FIG. 10.

As illustrated in FIG. 10, when the processing at Step S103 is complete, the controller 9 proceeds to Step S104. At Step S104, the controller 9 executes the facility application 81 acquired from the cartridge 1000. For example, the controller 9 may execute the facility application 81 when an execution request is received from the user. For example, the controller 9 may execute the facility application 81 when a start request is received from the attraction facility. The controller 9 provides a service according to the attraction facility to the user by executing the facility application 81. For example, the controller 9 can provide a service according to the attraction facility by using the function of the head mounted display 1 which is switched on.

At Step S105, the controller 9 determines whether the facility application 81 is completed. When it is determined that the facility application 81 is completed (Yes at Step S105), the controller 9 proceeds to Step S106.

At Step S106, the controller 9 determines, through the interface unit 10, whether release of the connection of the cartridge 1000 is detected or not. For example, the controller 9 determines that the release of the connection of the cartridge 1000 is detected when reading/writing of data with respect to the cartridge 1000 is not possible. When it is determined that the release of the connection of the cartridge 1000 is not detected (No at Step S106), the controller 9 repeats processing of Step S106. When it is determined that the release of the connection of the cartridge 1000 is detected (Yes at Step S106), the controller 9 proceeds to Step S107.

At Step S107, the controller 9 returns, based on the information stored in the storage 8, the on/off states of the functions of the head mounted display 1 to the on/off states at a time of the activation of the operation mode. At Step S108, the controller 9 changes the on/off states of the functions in the control data 82 to the on/off states of the functions before the activation of the operation mode. At Step S109, the controller 9 deletes the facility application 81 and the cartridge data 83 from the storage 8, and ends the processing procedure illustrated in FIG. 10.

When it is determined that the facility application 81 is not completed (No at Step S105), the controller 9 proceeds to Step S110. At Step S110, the controller 9 determines whether an emergency notification is received or not. For example, when the emergency notification is received by the communicator 7, the controller 9 determines that the emergency notification was generated. When it is determined that the emergency notification is not received (No at Step S110), the controller 9 returns to Step S105 described above. When it is determined that the emergency notification is received (Yes at Step S110), the controller 9 proceeds to Step S111.

At Step S111, the controller 9 cancels the off state of the notification function of the head mounted display 1. For example, the cancellation of the off state may be a process of changing the function for the notification from the off state to the on state. For example, the cancellation of the off state may be a process of allowing the emergency notification without changing the off-setting of the function for notification. For example, the cancellation of the off state may be a process of not changing the function when the function for the notification is in the on state.

At Step S112, the controller 9 notifies the emergency. For example, the controller 9 causes the display 2a, 2b to display the received emergency notification, and causes the input/output unit 11 to output a notification sound. For example, the controller 9 may cause the vibrator 12 to vibrate. At Step S113, the controller 9 performs a process for the emergency notification. For example, the process for the emergency notification includes a process of forced termination of the facility application 81 being executed. When the processing at Step S113 is complete, the controller 9 ends the processing procedure illustrated in FIG. 10.

The processing procedure illustrated in FIG. 10 describes a case where the controller 9 executes the facility application 81 after activating an operation mode and setting the on/off states of the functions of the head mounted display 1; however, embodiments are not limited thereto. For example, the operation mode may be initial processing of the facility application 81. In this case, the controller 9 activates the operation mode by executing the facility application 81 acquired from the cartridge 1000.

The processing procedure illustrated in FIG. 10 describes a case where the controller 9 ends the process after notifying the emergency; however, embodiments are not limited thereto. For example, the processing procedure may be such that, after the emergency is notified at Step S112, the process is returned to Step S105 to continue execution of the facility application 81.

In embodiments described above, a case is described where the predetermined operation mode is a mode of determining the on/off states of the functions of the head mounted display 1 according to information (the cartridge data 83) acquired from the cartridge 1000; however, embodiments are not limited thereto. For example, the predetermined operation mode may be specified to be a mode of changing an adjustment value regarding the functions of the head mounted display 1 according to information (the cartridge data 83) acquired from the cartridge 1000. The mode of changing the adjustment value regarding the functions of the head mounted display 1 corresponds to a mode of changing the brightness of a screen with respect to the function for the screen adjustment as described above, for example.

In embodiments described above, a case is described where the head mounted display 1 acquires the facility application 81 from the cartridge 1000; however, embodiments are not limited thereto. For example, the head mounted display 1 may acquire the facility application 81 from a server on the attraction facility side through the communicator 7.

In embodiments described above, a case is described where the head mounted display 1 acquires the facility application 81 from the cartridge 1000; however, embodiments are not limited thereto. For example, the head mounted display 1 may acquire contents to be used at the attraction facility, instead of the application, and may reproduce the contents using a reproduction function.

In embodiments, configurations and operations of the head mount display 1 has been described, but the head mount display 1 is not limited thereto, and may be configured as a method including respective component elements.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head mounted display comprising:
an interface unit to which a cartridge can be connected wherein the cartridge includes information indicating one or more functions of the head mounted display which are used on an execution of a facility application to be executed at a facility among a plurality of functions of the head mounted display; and
at least one controller configured to activate a predetermined operation mode, which is a mode of determining on/off state of functions of the head mounted display based on the acquired information, according to the information acquired from the cartridge in response to the cartridge being connected to the interface unit so that the head mounted display can put only the one or more functions used on the execution of the facility application to be executed into the on-state, and can put other functions into the off-state, wherein
the other functions to be put into the off-state in response to the cartridge being connected to the interface unit include at least one of a call, an email, imaging, short range wireless communication, sound input/output, display, notification, touch operation, position detection, vibration, acceleration detection, simultaneous execution of another application, and screen adjustment.

2. The head mounted display according to claim 1, wherein the at least one controller is further configured to acquire an application from the cartridge.

3. The head mounted display according to claim 1, wherein the function includes a reproduction function, and
the at least one controller is further configured to turn on the reproduction function for at least one of an image and a sound according to the acquired information.

4. The head mounted display according to claim 1 further comprising a communicator,
wherein the function includes a notification function, and
when an emergency notification is received by the communicator, the at least one controller is further configured to turn on the notification function and notify the emergency.

5. The head mounted display according to claim 4, wherein
in response to the communicator receiving the emergency notification, the at least one controller is configured to execute forced termination of the facility application being executed before the receipt of the emergency notification.

6. The head mounted display according to claim 1, further comprising:
a display;
a front formed to at least partially surround outer circumferential portions of the display; and
a temple wherein one end portion of the temple is connected to the front, wherein the interface unit is provided in the front or the temple.

* * * * *